United States Patent
Shimazaki et al.

(10) Patent No.: US 9,305,236 B2
(45) Date of Patent: Apr. 5, 2016

(54) IMAGE PROCESSING APPARATUS, IMAGE PROCESSING METHOD, AND COMPUTER-READABLE, NON-TRANSITORY MEDIUM

(71) Applicant: PFU LIMITED, Kahoku-shi, Ishikawa (JP)

(72) Inventors: Katsuhito Shimazaki, Kahoku (JP); Yuki Matsuda, Kahoku (JP)

(73) Assignee: PFU Limited, Kahoku-shi (JP)

( * ) Notice: Subject to any disclaimer, the term of this patent is extended or adjusted under 35 U.S.C. 154(b) by 136 days.

(21) Appl. No.: 14/178,641

(22) Filed: Feb. 12, 2014

(65) Prior Publication Data

US 2015/0077817 A1   Mar. 19, 2015

(30) Foreign Application Priority Data

Sep. 19, 2013   (JP) .................... 2013-194488

(51) Int. Cl.
*G06K 9/72* (2006.01)
*G06K 9/46* (2006.01)
*H04N 1/48* (2006.01)
*G06K 9/00* (2006.01)
*H04N 1/387* (2006.01)
*H04N 1/40* (2006.01)

(52) U.S. Cl.
CPC .......... *G06K 9/4647* (2013.01); *G06K 9/00483* (2013.01); *H04N 1/3873* (2013.01); *H04N 1/3878* (2013.01); *H04N 1/40062* (2013.01); *H04N 1/48* (2013.01)

(58) Field of Classification Search
None
See application file for complete search history.

(56) References Cited

U.S. PATENT DOCUMENTS

| | | | | |
|---|---|---|---|---|
| 5,832,530 A | * | 11/1998 | Paknad et al. | 715/235 |
| 6,389,162 B2 | * | 5/2002 | Maeda | 382/172 |
| 2008/0117479 A1 | * | 5/2008 | Kosaka et al. | 358/474 |
| 2010/0296115 A1 | | 11/2010 | Onishi | |

FOREIGN PATENT DOCUMENTS

| | | |
|---|---|---|
| JP | 2008-131254 | 6/2008 |
| JP | 2010-273053 | 12/2010 |

* cited by examiner

*Primary Examiner* — Chan Park
*Assistant Examiner* — Elisa Rice
(74) *Attorney, Agent, or Firm* — Lewis Roca Rothgerber Christie LLP

(57) ABSTRACT

The image processing apparatus includes an input image acquisition module for acquiring an input image generated by reading a document, a character string information calculator for calculating character string density or character string variance in the input image, and a document type identification module for identifying a type of the document based on the character string density or the character string variance.

17 Claims, 11 Drawing Sheets

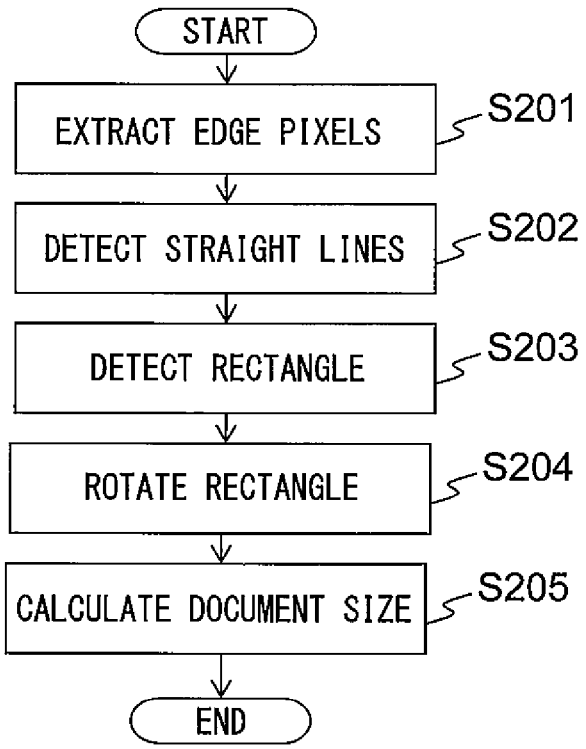
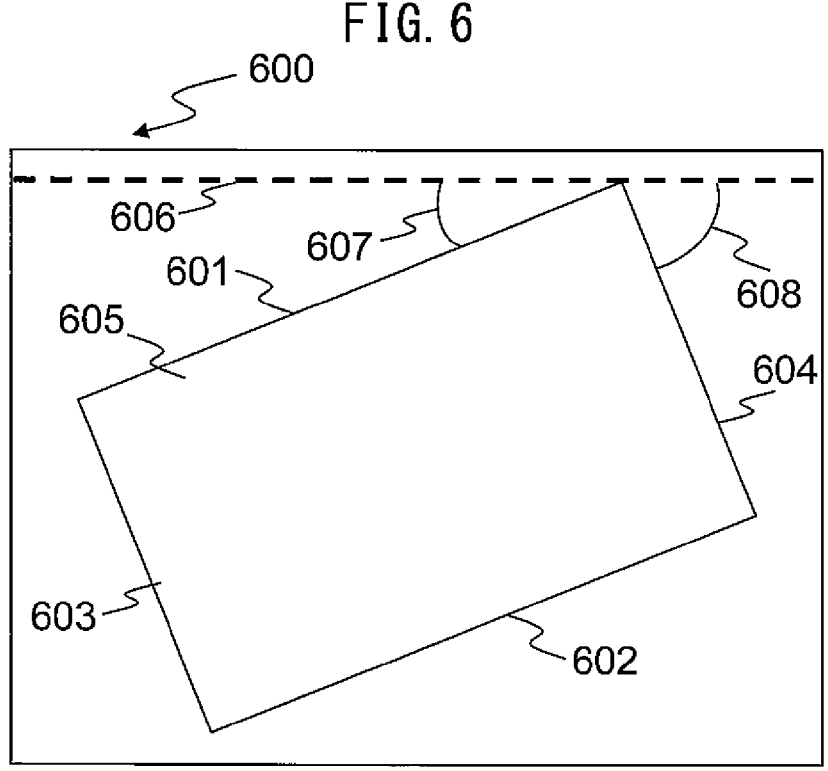

IMAGE PROCESSING APPARATUS, IMAGE PROCESSING METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2013-194488, filed on Sep. 19, 2013, the entire contents of which are incorporated herein by reference.

TECHNICAL FIELD

Embodiments discussed in the present specification relate to image processing technology.

BACKGROUND

In general, an image reading apparatus such as a scanner reads a document, temporarily stores the document on a storage unit as image data, and transmits the image data to an information processing apparatus such as a personal computer. On the other hand, the information processing apparatus applies OCR (Optical Character Recognition) processing to the image data received from the image reader and then acquires specific information to manage the image data in connection with the acquired information. Such an information processing apparatus desirably manages image data with respect to respective types of documents such as receipts, business cards, and photographs.

Japanese Laid-open Patent Publication No. 2008-131254 discloses an image reading processor which stores setting information with applications to be activated based on document sizes and then determines and activates an application corresponding to a document size of a read image based on the setting information.

Further, Japanese Laid-open Patent Publication No. 2010-273053 discloses an image processing apparatus that determines whether read image data is a color image or a black and white image. This image processing apparatus specifies the size of the document based on when the front edge and the rear edge of a document being conveyed are detected, and also determines whether read image data is a color image or a black and white image for each sizes of a plurality of regular-size sheets. Then, the image processing apparatus selects a determination result which has been determined using a size of a regular-size sheet that is the same as the size of the specified document, from a plurality of determination results.

SUMMARY

An image processing apparatus using image data obtained by reading a document desirably determines a type of a document accurately.

Accordingly, it is an object of the present invention to provide an image processing apparatus and an image processing method that are capable of accurately identifying a type of a document, and a computer-readable, non-transitory medium storing a computer program for causing a computer to implement such an image processing method.

According to an aspect of the apparatus, there is provided an image processing apparatus. The image processing apparatus includes an input image acquisition module for acquiring an input image generated by reading a document, a character string information calculator for calculating character string density or character string variance in the input image, and a document type identification module for identifying a type of the document based on the character string density or the character string variance.

According to an aspect of the method, there is provide an image processing method. The image processing method includes acquiring an input image generated by reading a document, calculating character string density or character string variance in the input image, and identifying, using a computer, a type of the document based on the character string density or the character string variance.

According to an aspect of the computer-readable, non-transitory medium storing a computer program, the computer program causes a computer to execute a process, including acquiring an input image generated by reading a document, calculating character string density or character string variance in the input image, and identifying a type of the document based on the character string density or the character string variance.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 5 is a flowchart depicting an example of an operation of document size calculation processing.

FIG. 6 is a schematic view for illustrating rotation of a rectangle.

DESCRIPTION OF EMBODIMENTS

Hereinafter, an image processing apparatus, an image processing method, and computer program according to an embodiment, will be described with reference to the drawings. However, note that the technical scope of the invention is not limited to these embodiments and extends to the inventions described in the claims and their equivalents.

Figure 1:
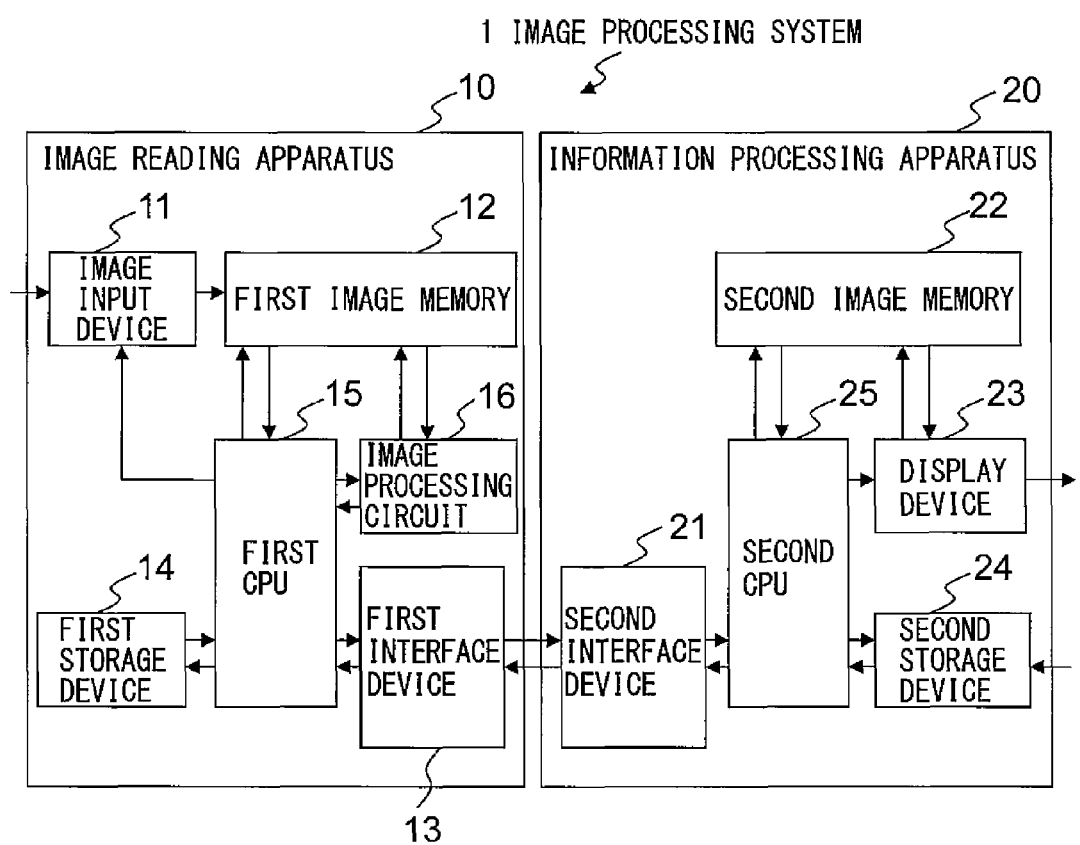
FIG. 1 is a hardware configuration diagram of an image processing system 1 according to an embodiment.

FIG. 1 is a hardware configuration diagram of an image processing system 1 according to an embodiment. As illustrated in FIG. 1, the image processing system 1 includes an image reading apparatus 10 and an information processing apparatus 20. The image reading apparatus 10 is an example of an image processing apparatus and is, for example, an image scanner, a digital camera, and the like. The information processing apparatus 20 is, for example, a personal computer and the like used by being connected to the image reading apparatus 10.

The image reading apparatus 10 includes an image input device 11, a first image memory 12, a first interface device 13, a first storage device 14, a first CPU (Central Processing Unit) 15, and an image processing circuit 16. Each part of the image reading apparatus 10 will be described below in detail.

The image input device 11 includes two image sensors individually imaging the front side and the back side of a document that is an imaging subject. Each image sensor includes imaging elements each of which is, for example, a CCD (Charge Coupled Device), a CMOS (Complementary Metal Oxide Semiconductor), arrayed one-dimensionally or two-dimensionally. The each image sensor further includes an optical system for forming an image of an imaging subject onto the imaging elements. Each imaging element outputs an analog value corresponding to each color of RGB. Then, the image input device 11 converts each analog value output by the image sensor into a digital value to generate pixel data, and then generates image data (hereinafter, referred to as an RGB image) configured by each pixel data generated. This RGB image is color image data in which, for example, each pixel data is expressed by 8 bits for each color of RGB, and is configured by RGB values of 24 bits in total.

The image input device 11 generates an image (hereinafter, referred to as an input image) which is obtained by converting RGB values of each pixel of an RGB image into luminance values and color difference values (YUV values), and then stores the thus-generated image on the first image memory 12. The YUV values can be calculated, for example, by the following expressions.

$$Y \text{ value} = 0.30 \times R \text{ value} + 0.59 \times G \text{ value} + 0.11 \times B \text{ value} \quad (1)$$

$$U \text{ value} = -0.17 \times R \text{ value} - 0.33 \times G \text{ value} + 0.50 \times B \text{ value} \quad (2)$$

$$V \text{ value} = 0.50 \times R \text{ value} - 0.42 \times G \text{ value} - 0.08 \times B \text{ value} \quad (3)$$

The first image memory 12 includes a storage device such as a non-volatile semiconductor memory, a volatile semiconductor memory, and a magnetic disk. The first image memory 12 is connected to the image input device 11 to store the input image generated by the image input device 11 and also connected to the image processing circuit 16 to store various types of processed images that the image processing circuit 16 produced by applying image processing operations to the input image.

The first interface device 13 includes an interface circuit conforming to a serial bus such as USB (Universal Serial Bus), and transmits and receives image data and various kinds of information by being electrically connected to the information processing apparatus 20. Further, it is possible to connect a flash memory or the like to the first interface device 13, to store image data stored in the first image memory 12.

The first storage device 14 includes a memory device such as a RAM (Random Access Memory) and a ROM (Read Only Memory), a fixed disk device such as a hard disk, or a portable storage device such as a flexible disk and an optical disk, and the like. Further, the first storage device 14 stores a computer program, a database, and a table used for various types of processing of the image reading apparatus 10, etc. The computer program may be installed on first storage device 14 from a computer-readable, non-transitory medium such as a compact disk read only memory (CD-ROM), a digital versatile disk read only memory (DVD-ROM), or the like by using a well-known setup program or the like.

The first CPU 15 is connected to the image input device 11, the first image memory 12, the first interface device 13, the first storage device 14, and the image processing circuit 16 to control each of these parts. The first CPU 15 controls such as input image generation of the image input device 11, the first image memory 12, data transmission to/reception from the information processing apparatus 20 via the first interface device 13, the first storage device 14, image processing by the image processing circuit 16.

The image processing circuit 16 is connected to the first image memory 12 and executes such as document type identification processing for identifying a type of a document. This image processing circuit 16 is connected to the first CPU 15, and operate based on a program previously stored in the first storage device 14, via the control from the first CPU 15. Alternatively, it is possible to configure the image processing circuit 16 by an independent integrated circuit, microprocessor, firmware, or the like.

The information processing apparatus 20 includes a second interface device 21, a second image memory 22, a display device 23, a second storage device 24, and a second CPU 25. Each part of the information processing apparatus 20 will be described below in detail.

The second interface device 21 includes the same interface circuit as in the first interface device 13 of the image reading apparatus 10 and connects the information processing apparatus 20 with the image reading apparatus 10.

The second image memory 22 includes the same storage device as in the first image memory 12 of the image reading apparatus 10. The second image memory 22 stores image data and various kinds of information received from the image reading apparatus 10 via the second interface device 21.

The display device 23 includes a display configured by a liquid crystal, an organic EL (Electro-Luminescence), or the like and an interface circuit for outputting image data to the display. The display device 23 displays image data stored in the second image memory 22 on the display by being connected to the second image memory 22.

The second storage device 24 includes the same memory device, fixed disk device, or portable storage device as in the first storage device 14 of the image reading apparatus 10. The second storage device 24 stores a computer program, a database, and a table used for various types of processing of the information processing apparatus 20, etc. The computer program may be installed on the second storage device 14 from a computer-readable, non-transitory medium such as a CD-ROM, a DVD-ROM, or the like by using a well-known setup program or the like.

The second CPU 25 is connected to the second interface device 21, the second image memory 22, the display device 23, and the second storage device 24 to control each of these parts. The second CPU 25 controls such as data transmission to/reception from the image reading apparatus 10 via the second interface device 21, the second image memory 22, display by the display device 23, and the second storage device 24.

Figure 2:
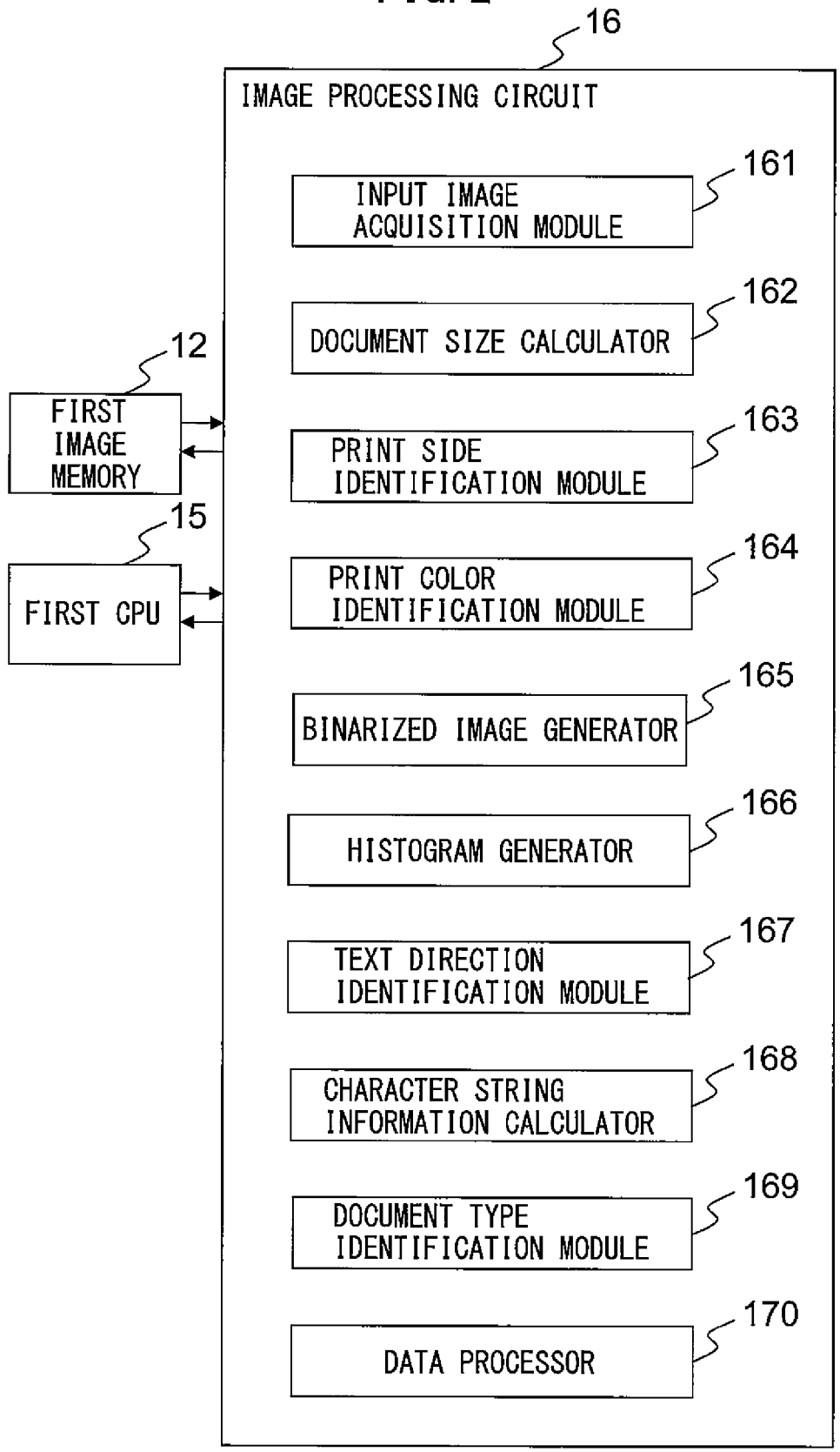
FIG. 2 is a functional block diagram of an image processing circuit 16.

FIG. 2 is a functional block diagram of the image processing circuit 16. As illustrated in FIG. 2, the image processing circuit 16 includes such as an input image acquisition module 161, a document size calculator 162, a print side identification module 163, a print color identification module 164, a binarized image generator 165, a histogram generator 166, a text direction identification module 167, and a character string information calculator 168. The image processing circuit 16 further includes a document type identification module 169, a data processor 170, and the like.

Figure 3:
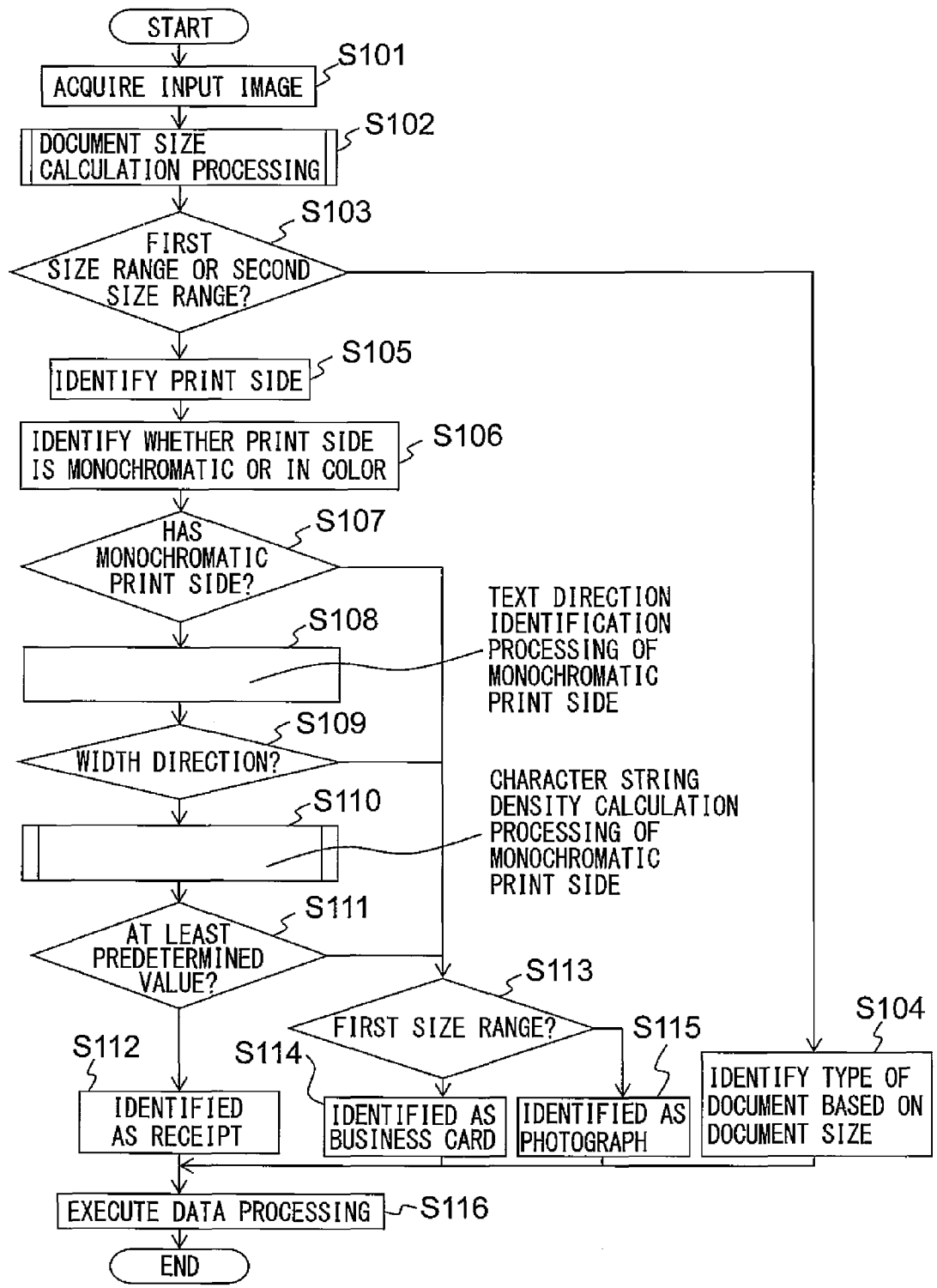
FIG. 3 is a flowchart illustrating an operation of document type identification processing.

FIG. 3 is a flowchart illustrating an operation of document type identification processing by the image reading apparatus 10. With reference to the flowchart illustrated in FIG. 3, the operation of document type identification processing is described below. The operation flow described below is executed mainly by the first CPU 15 based on a program previously stored in the first storage device 14 in collaboration with each element of the image reading apparatus 10. In the example illustrated in FIG. 3, the image input device 11 identifies a receipt, a business card, a photograph, and a PPC (Plain Paper Copier) sheet as a type of a document.

Initially, the image input device 11 reads an imaging subject (document) and generates an RGB image and an input image to be stored in the first image memory 12. The input image acquisition module 161 reads the RGB image and the input image from the first image memory 12 and then acquires these images (S101).

Subsequently, the document size calculator 162 executes document size calculation processing (S102). In the document size calculation processing, the document size calculator 162 calculates a size of a document based on the input image. The document size calculation processing will be described later in detail.

Then, the document type identification module 169 determines whether the document size falls within a first size range that is a range common to a size range of receipts and a size range of business cards or a second size range common to the size range of receipts and a size range of photographs (S103).

Figure 4:
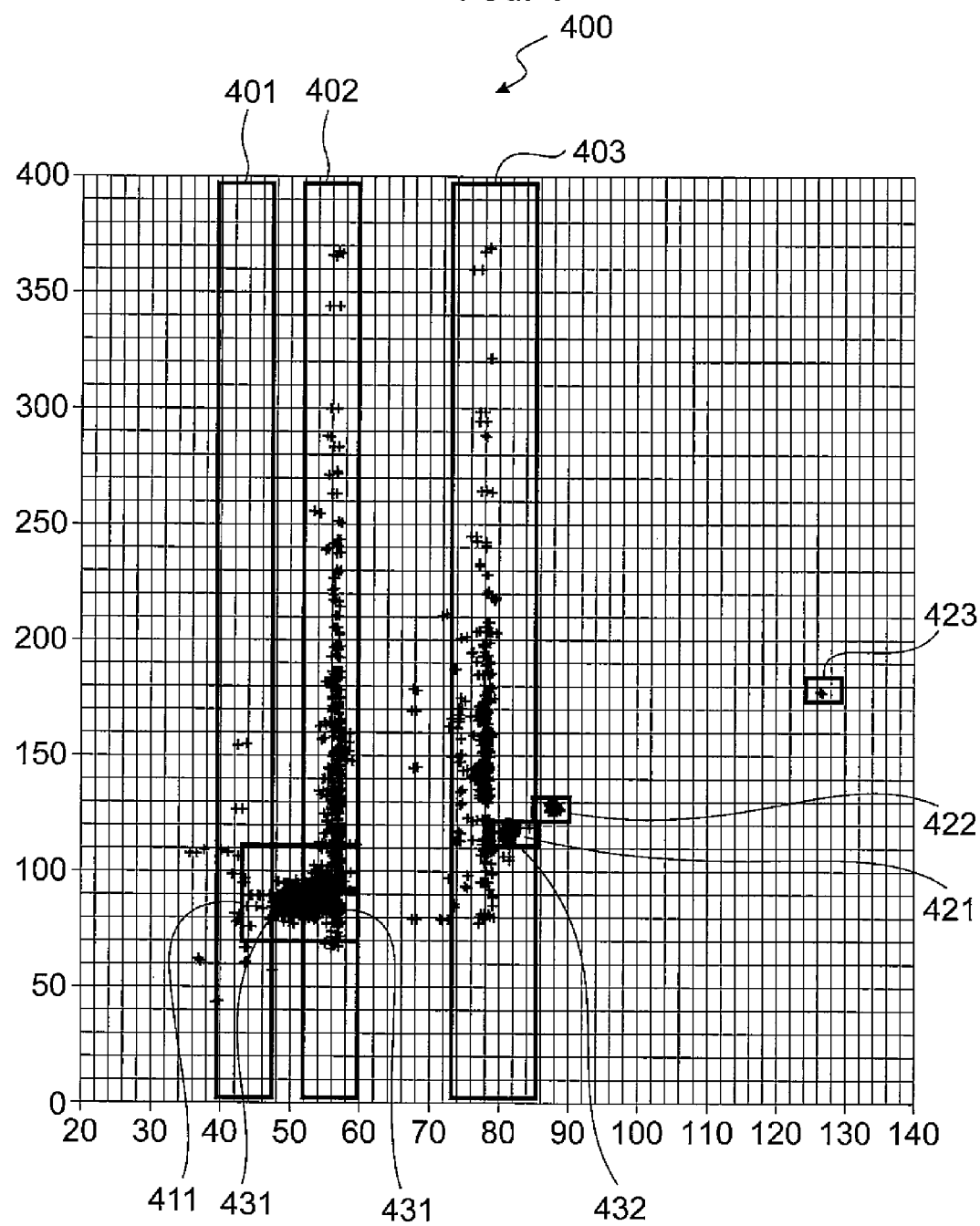
FIG. 4 is a schematic view for illustrating a document size.

FIG. 4 is a schematic view for illustrating a document size. A graph 400 illustrated in FIG. 4 is a graph in which sizes calculated from input images generated by reading various types of receipts, business cards, and photographs are plotted. The horizontal axis of the graph 400 indicates horizontal length (mm) and the vertical axis thereof indicates vertical length (mm). Herein, the horizontal direction of a receipt is designated as a width direction (a direction at right angles to the conveyance direction of a receipt during printing of the receipt) and the horizontal direction of a business card and a photograph is designated as a short-length direction.

Regions 401 to 403 indicate regions where most of the sizes calculated from the input images generated by reading receipts are plotted. Since a general receipt has a specified length (for example, 45 mm, 58 mm, and 80 mm) in the width direction, the regions 401 to 403 are in regions along lines of 45 mm, 58 mm, and 80 mm in the horizontal direction, respectively.

A region 411 indicates a region where most of the sizes calculated from the input images generated by reading business cards are plotted. The region 411 according to business cards falls within a range having a length of 70 mm to 110 mm in the longitudinal direction and a range having a length of 43 mm to 60 mm in the short-length direction.

Regions 421 to 423 indicate regions where most of the sizes calculated from the input images generated by reading photographs are plotted. The size of a general photograph is any one of E-size (83 mm×117 mm), L-size (89 mm×127 mm), and 2L-size (127 mm×178 mm). The region 421 corresponds to a photograph of E-size, the region 422 corresponds to a photograph of L-size, and the region 423 corresponds to a photograph of 2L-size.

As illustrated in FIG. 4, the regions 401 and 402 according to receipts and the region 411 according to business cards are overlapped with each other in a region 431, and the region 403 according to the receipts and the region 421 according to the photographs are overlapped with each other in a region 432. Therefore, when a document is identified as a receipt, a business card, or a photograph from sizes of documents calculated based on the input images, there is a possibility that a determination is erroneously made. When the document size falls within a range common to a size range of receipts and a size range of business cards as in the region 431 or a range common to the size range of receipts and a size range of photographs as in the region 432, it is necessary to identify a type of the document based on elements other than the document size.

Then, when the document size does not fall within the first size range or the second size range, the document type identification module 169 identifies a type of the document based on the document size (S104) and then the processing proceeds to S116. When the document size falls within a range corresponding to any one of the regions illustrated in FIG. 4, the document type identification module 169 identifies the document as a receipt, a business card, or a photograph corresponding to the region. On the other hand, when the document size does not fall within any range corresponding to each region, the document type identification module 169 identifies the document as a PPC sheet.

On the other hand, when the document size falls within the first size range or the second size range, the print side identification module 163 determines whether each of the front side and the back side of the document is a print side (S105). The document type identification module 169 binarizes luminance values of input images on which the front side and the back side of the document are imaged, at a predetermined binarization threshold value (for example, 128). When a ratio of the number of pixels representing any one of the binarized values to the number of all pixels is equal to a predetermined ratio (for example, 1%) or less, the document type identification module 169 identifies that this corresponding side is not a print side.

Then, the print color identification module 164 identifies whether the side identified as a print side by the print side identification module 163 is monochromatic or in color (S106). With respect to an RGB image, the print color identification module 164 generates a histogram with each R value being designated as a class and the number of pixels representing each R value being designated as a frequency. In the same manner, the print color identification module 164 generates a histogram with each G value being designated as a class and the number of pixels representing each G value being designated as a frequency, and a histogram with each B value being designated as a class and the number of pixels representing each B value being designated as a frequency. The print color identification module 164 identifies whether a number of classes each of whose frequency is a threshold value Th1 or more, is a predetermined number or more in each generated histogram. When the number of classes each of whose frequency is a threshold value Th1 or more, are a predetermined number or more, the print color identification module 164 identifies the side to be in color, and identifies the side to be monochromatic when the number of classes are less than a predetermined number.

Then, the print color identification module 164 identifies whether the document has a monochromatic print side (S107). When any one of the sides identified as print sides by the print side identification module 163 is monochromatic, the print color identification module 164 identifies that the document has a monochromatic print side. When neither of the sides identified as print sides by the print side identification module 163 is monochromatic, the print color identification module 164 identifies that the document has no monochromatic print side.

On a general receipt, a trade name, money amount, and the like are printed monochromatically, and its back side may be blank or have characters, photographs, images, and the like of for example a store advertisement monochromatically or in color. On the other hand, on a general business card, both sides or one side thereof is printed with a name, a company name, an address, a phone number, and the like monochromatically or in color. Further, on a general photograph, a photographed image is printed in color, and its back side is blank or has a date and time and the like monochromatically. Therefore, when the document has no monochromatic print side, the document is able to be identified as not being a receipt.

Subsequently, when the document has no monochromatic print side, the document type identification module 169 identifies the document not to be a receipt but to be a business card or a photograph, and the processing proceeds to S113.

On the other hand, when the document has a monochromatic print side, the text direction identification module 167 executes text direction identification processing (S108). In the text direction identification processing, the text direction identification module 167 identifies a text direction where characters printed in the document are aligned, based on the input image. The text direction identification processing will be described later in detail.

Then, the document type identification module 169 determines whether the text direction identified by the text direction identification module 167 is horizontal (S109). When any one of a size of the longitudinal direction of the document and a size of the short-length direction thereof is substantially equal to a length of the width direction specified for general receipts, the document type identification module 169 identifies the substantially equal direction as the horizontal direction and the other direction as the vertical direction. On the other hand, when neither the size of the longitudinal direction of the document nor the size of the short-length direction thereof is substantially equal to the length of the width direction specified for general receipts, the document type identification module 169 identifies the short-length direction of the document as the horizontal direction and the longitudinal direction thereof as the vertical direction. In other words, when the document is a receipt, the width direction becomes the horizontal direction, and when the document is not a receipt, the short-length direction becomes the horizontal direction.

On general receipts, a character string such as a trade name, a money amount, and the like is arranged in the width direction (horizontal direction). On the other hand, on general business cards, a character string such as a name, a company name, an address, a phone number, and the like is arranged in the longitudinal direction (vertical direction). However, on some business cards, such a character string is arranged in the short-length direction (horizontal direction). Further, on photographs, a character string is arranged in the longitudinal direction (vertical direction) in some cases and in the short-length direction (horizontal direction) in other cases. Therefore, when the text direction is not the horizontal direction, it is possible to identify that the document is not at least a receipt.

Then, when the text direction is not the horizontal direction, the document type identification module 169 identifies the document not to be a receipt but to be a business card or a photograph, and then the processing proceeds to S113.

On the other hand, when the text direction is the horizontal direction, the character string information calculator 168 executes character string information calculation processing (S110). In the character string information calculation processing, the character string information calculator 168 calculates character string densities of the horizontal direction and the vertical direction on the input image as character string information. The character string density is a ratio of character string variance to the entire input image. The character string information calculation processing will be described later in detail.

Then, the document type identification module 169 determines whether the character string density calculated by the character string information calculator 168 is larger than a predetermined value V1 (S111). The predetermined value V1 is set as a central value between an average value of character string densities calculated for various types of receipts and an average value of character string densities calculated for various types of business cards printed with characters in the short-length direction via previous experiments (for example, 30%).

A business card having character strings arranged in the short-length direction tends to have much blank space. Therefore, it is highly possible that in a business card having character strings arranged in the short-length direction, a ratio of a region where characters are arranged to the entire business card is smaller than a ratio of a region where characters are arranged to the entire receipt with respect to a general receipt. Further, when a character string such as a shooting date and time and the like is arranged on the back side of a photograph, generally, the character string is arranged in the lower edge of the photograph and most of the back side has blank space. Therefore, it is highly possible that a ratio of a region where characters are arranged to the entire photograph with respect to the back side of a photograph is smaller than a ratio of a region where characters are arranged to the entire receipt with respect to a general receipt.

When at least one of the character string density of the horizontal direction and the character string density of the vertical direction is equal to the predetermined value V1 or less, the document type identification module 169 determines that the character string density is equal to the predetermined value V1 or less. On the other hand, when both the character string density of the horizontal direction and the character string density of the vertical direction are larger than the predetermined value V1, the document type identification module 169 determines that the character string density is larger than the predetermined value V1.

Then, when the character string density is equal to the predetermined value V1 or less, the document type identification module 169 identifies that a type of the document is not a receipt, and the processing proceeds to S113.

On the other hand, when the character string density is larger than the predetermined value V1, the document type identification module 169 identifies that the document is a receipt (S112), and the processing proceeds to S116.

In S113, the document type identification module 169 determines whether the document size calculated by the document size calculator 162 falls within the first size or the second size.

When the document size falls within the first size, the document type identification module 169 identifies the document as a business card (S114), and identifies the document as a photograph when the document size falls within the second size (S115), and then the processing proceeds to S116.

In S116, the data processor 170 executes data processing according to a type of the document identified by the document type identification module 169, and then a series of steps is terminated.

The data processor 170 acquires specific information from image data using a well-known OCR technique. When the document is a receipt, the data processor 170 extracts a character string described in a format such as "MM(month) DD(day),YYYY(year)" or "YYYY/MM/DD" from the input image and then acquires information indicating a purchased date and time. Further, the data processor 170 extracts a character string or a logotype described in the upper portion of the input image and then acquires information indicating a store name. Further, the data processor 170 extracts a character string located on the right side of a character string such as "Sum" or "Total" described in the lower portion of the input image and then acquires information indicating an amount of money. In addition, the data processor 170 extracts character strings described in a listed manner in the center portion of the input image and then acquires information indicating items.

On the other hand, when the document is a business card, the data processor 170 acquires information indicating a name from a character string having a larger region than other character strings in the center portion of the input image, and also extracts a logotype from the input image to acquire information indicating a company name. Further, the data processor 170 extracts a number string located on the right side of a character string such as "TEL" or a mark indicating a telephone described in the input image to acquire information indicating a phone number. In addition, the data processor 170 extracts an alphanumeric string located on the right side of a character string such as "Mail" or a mark indicating E-mail described in the input image to acquire information indicating a mail address.

On the other hand, when the document is a photograph, the data processor 170 extracts a character string of a format such as "MM(month) DD(day), YYYY(year)" or "YYYY/MM/DD" from the input image and then acquires information indicating a shooting date and time or a print date and time.

The data processor 170 stores the input image, a type of the document, and respective pieces of acquired information in the first image memory 12 being associated with each other and also transmits the aforementioned items to the information processing apparatus 20 via the first interface device 13.

Herein, it is possible that the data processor 170 changes a region for storing input images in the first image memory 12 for respective types of documents. Further, it is possible for the data processor 170 to execute correction processing according to a type of a document using a well-known image processing technique. In addition, it is possible that a plurality of application programs corresponding to types of respective documents (receipt, business card, and photograph) are stored in the first storage device 14 being associated with the types of the documents and then the data processor 170 executes an application program associated with a type of a document.

As described above, the document type identification module 169 identifies a type of a document based on a size of the document, whether the document has a monochromatic print side, text direction, and character string density. Herein, it is possible that the document type identification module 169 identifies a type of a document without using a size of a document, whether the document has a monochromatic print side, and/or text direction.

For example, the processing of S102 to S104 and S113 to S115 may be omitted and then the document type identification module 169 may only determine whether a document is a receipt. In this case, the processing of S106 to S107 and/or S108 to S109 may further be omitted and then the document type identification module 169 may determine whether the document is a receipt. Further, while executing the processing of S102 to S104 and S113 to S115, the processing of S106 to S107 and/or S108 to S109 may be omitted and then the document type identification module 169 may identify a type of the document.

In general, a user is likely to cause the image reading apparatus 10 to read documents of the same type together. Therefore, when the image reading apparatus 10 reads a plurality of documents continuously, it is possible that the document type identification module 169 identifies a type of a document being processed using an identification result of a type of any of documents which is read before or after the document being processed. For example, the document type identification module 169 determines that a type of a document is the same as a type of a document conveyed immediately before. Alternatively, it is possible that the document type identification module 169 identifies types of respective documents with respect to a plurality of documents continuously read and then identifies the types of all documents continuously read as a type of documents identified most frequently.

Alternatively, when the image reading apparatus 10 continuously reads a plurality of documents, it is possible that the document type identification module 169 changes the identification method for a type of a document being processed, using an identification result of a type of any of documents read before or after the document being processed. For example, when a document read immediately before has been identified as a receipt, the predetermined value V1 which is to be compared with a character string density is lowered to allow the document type identification module 169 to easily identify the document being processed as a receipt. On the other hand, when the document conveyed immediately before has been identified to be not a receipt, the predetermined value V1 which is to be compared with a character string density is raised to allow the document type identification module 169 to easily identify the document being processed to be not a receipt. Thereby, the document type identification module 169 is able to identify a type of a document more accurately.

FIG. 5 is a flowchart depicting an example of an operation of document size calculation processing. The operation flow illustrated in FIG. 5 is executed in S102 of the flowchart illustrated in FIG. 3.

Initially, the document size calculator 162 extracts edge pixels in the horizontal direction and the vertical direction with respect to a luminance value of an input image (S201).

The document size calculator 162 calculates the absolute value of a difference in luminance value between two pixels adjacent to each other in the horizontal direction of the respective pixels on the input image (hereinafter, referred to as an adjacent difference value), and identifies the pixels on the image as vertical edge pixels when the adjacent difference value exceeds a threshold value Th2. It is possible to set the threshold value Th2 at a difference in luminance value (for example, 15) which people can visually discriminate a luminance difference on an image. The document size calculator 162 also executes the same processing for the vertical direction to extract horizontal edge pixels.

Subsequently, the document size calculator 162 detects a plurality of straight lines respectively from edge image generated from the horizontal pixels (hereinafter, referred to as a horizontal edge image) and an edge image generated from the vertical pixels (hereinafter, referred to as a vertical edge image) (S202). Herein, a straight line extending horizontally is detected from the horizontal edge image, and a straight line extending vertically is detected from the vertical edge image. The document size calculator 162 detects straight lines using Hough transform. It is possible that the document size calculator 162 detects straight lines using the least-square method.

Then, the document size calculator 162 detects a rectangle formed with the detected straight lines (S303). The document size calculator 162 extracts a plurality of rectangle candidates formed with four straight lines, each two of which are substantially at right angles to each other among a plurality of straight lines detected. The document size calculator 162 initially selects one horizontal straight line (hereinafter, referred to as a first horizontal line) and then extracts a horizontal straight line (hereinafter, referred to as a second horizontal line) being substantially parallel (for example, within ±3° to the selected straight line and being distant by at least a threshold value Th3 therefrom. Then, the document size calculator 162 extracts a vertical straight line (hereinafter, referred to as a first vertical line) being substantially at right angles (for example, within ±3° with respect to 90°) to the first horizontal line. Then, the document size calculator 162 extracts a vertical straight line (hereinafter, referred to as a second vertical line) being substantially at right angles to the first horizontal line and being distant by at least a threshold value Th4 from the first vertical line. Herein, the threshold value Th3 and the threshold value Th4 may be previously determined according to a size of a document serving as a subject to be read by the image reading apparatus 10 and both threshold values may be the same.

The document size calculator 162 extracts all combinations of the first horizontal line, the second horizontal line, the first vertical line, and the second vertical line satisfying the above conditions with respect to all detected straight lines, and then extracts rectangles formed with the respective extracted combinations as rectangle candidates. The document size calculator 162 calculates areas of the extracted rectangle candidates and detects a rectangle candidate having the largest area as a rectangle.

Then the document size calculator 162 rotates the rectangle so that the four sides of the detected rectangle each are substantially parallel to the four sides of the input image (S204).

FIG. 6 is a schematic view for illustrating rotation of a rectangle. In an input image 600 illustrated in FIG. 6, a rectangle 605 formed with a first horizontal line 601, a second horizontal line 602, a first vertical line 603, and a second vertical line 604 is detected. The document size calculator 162 calculates an angle 607 between the first horizontal line 601 located on a side closer to the upper edge of the input image 600 of the two horizontal lines and a horizontal line 606 parallel to the upper edge of the input image 600. In the same manner, the document size calculator 162 calculates an angle 608 between the second vertical line 604 located on a side closer to the upper edge of the input image 600 of the two horizontal lines and the horizontal line 606. When the angle 607 is equal to or smaller than the angle 608, the document size calculator 162 rotates the rectangle 605 so that the first horizontal line 601 is parallel to the horizontal line 606 (so that the angle 607 becomes 0°). On the other hand, when the angle 607 is larger than the angle 608, the document size calculator 162 rotates the rectangle 605 so that the second vertical line 604 becomes parallel to the horizontal line 606 (so that the angle 608 is 0°).

Then, the document size calculator 162 calculates a size of the longitudinal direction and a size of the short-length direction of the document from the number of dots in the longitudinal direction and the number of dots in the short-length direction in the detected rectangle and a resolution (dpi; dots per inch) at the time of reading the document (S205). The document size calculator 162 calculates each size, and then a series of steps is terminated.

Figure 7:
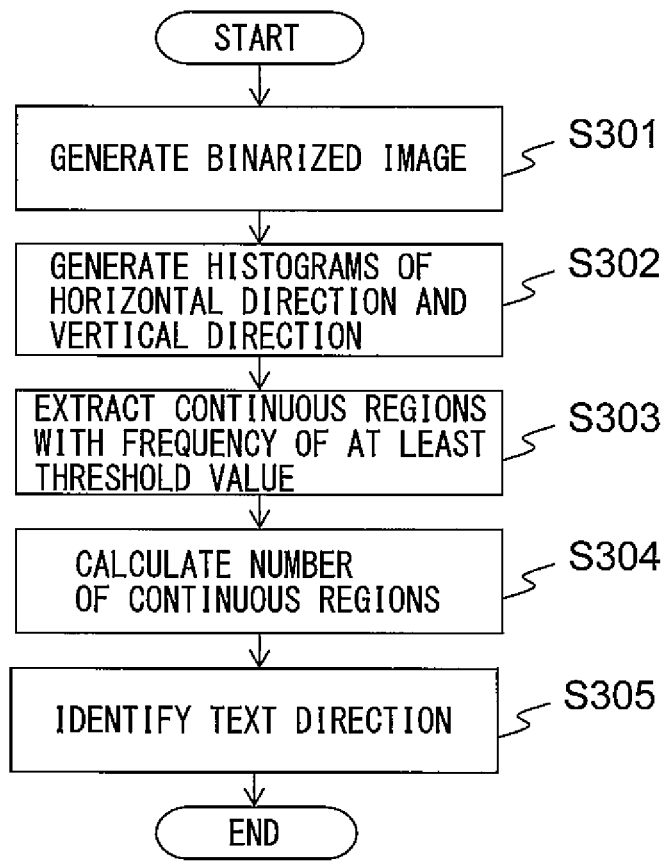
FIG. 7 is a flowchart depicting an example of an operation of text direction identification processing.

FIG. 7 is a flowchart depicting an example of an operation of text direction identification processing. The operation flow illustrated in FIG. 7 is executed in S108 of the flowchart illustrated in FIG. 3.

Initially, the binarized image generator 165 generates a binarized image by binarizing an input image (S301). The binarized image generator 165 applies binarization processing to a luminance value of the input image using a binarization threshold value, and then generates a binarized image with pixels that are equal to or larger than the binarization threshold value being converted into valid pixels (black pixels) and pixels that are less than the binarization threshold value being converted into invalid pixels (white pixels). It is possible to designate the binarization threshold value such as a predetermined value (for example, 128), or an average value of luminance values of all pixels in the input image.

Subsequently, the histogram generator 166 generates a histogram of valid pixels in the binarized image (S302). The histogram generator 166 generates a histogram by using classes each of which is one or more lines of the horizontal direction or the vertical direction in the binarized image and frequencies each of which is the number of valid pixels in corresponding lines of the horizontal direction or the vertical direction. The histogram generator 166 generates a horizontal histogram in which a predetermined number of continuous lines in the horizontal direction are designated as one class and the number of valid pixels on the predetermined number of lines in the horizontal direction is designated as a frequency. In the same manner, the histogram generator 166 generates a vertical histogram in which a predetermined number of continuous lines in the vertical direction are designated as one class and the number of valid pixels on the predetermined number of lines in the vertical direction is designated as a frequency. The predetermined number is, for example, 1 and may be a value of 2 or more to reduce processing load.

Then, the text direction identification module 167 extracts a continuous region where a width of a class falls within a predetermined range among continuous regions, where classes each of whose frequency is a threshold value or more continue, in the histogram generated by the histogram generator 166 (S303). With respect to each of the horizontal histogram and the vertical histogram, the text direction identification module 167 extracts classes each of whose frequency is a threshold value Th5 or more. The text direction identification module 167 then extracts a region where classes each of whose frequency is a threshold value Th5 or more continue as a first continuous region. This threshold value Th5 is, for example, 1 and may be a value of 2 or more to eliminate noise of a certain level. The text direction identification module 167 extracts, as a second continuous region, a region falling within a range equivalent to a range where a width of a class is assumed to be a character height or width (for example, 2 mm to 6 mm), from the extracted first continuous region.

Then, the text direction identification module 167 calculates the number of second continuous regions extracted from the horizontal histogram and the number of second continuous regions extracted from the vertical histogram (S304).

Then, the text direction identification module 167 identifies a text direction from the number of the second continuous regions extracted from the horizontal histogram and the number of the second continuous regions extracted from the vertical histogram (S305). When the number of the second continuous regions extracted from the horizontal histogram is equal to or more than the number of the second continuous regions extracted from the vertical histogram, the text direction identification module 167 identifies the text direction as the horizontal direction. On the other hand, when the number of the second continuous regions extracted from the horizontal histogram is less than the number of the second continuous regions extracted from the vertical histogram, the text direction identification module 167 identifies the text direction as the vertical direction.

Figure 8:
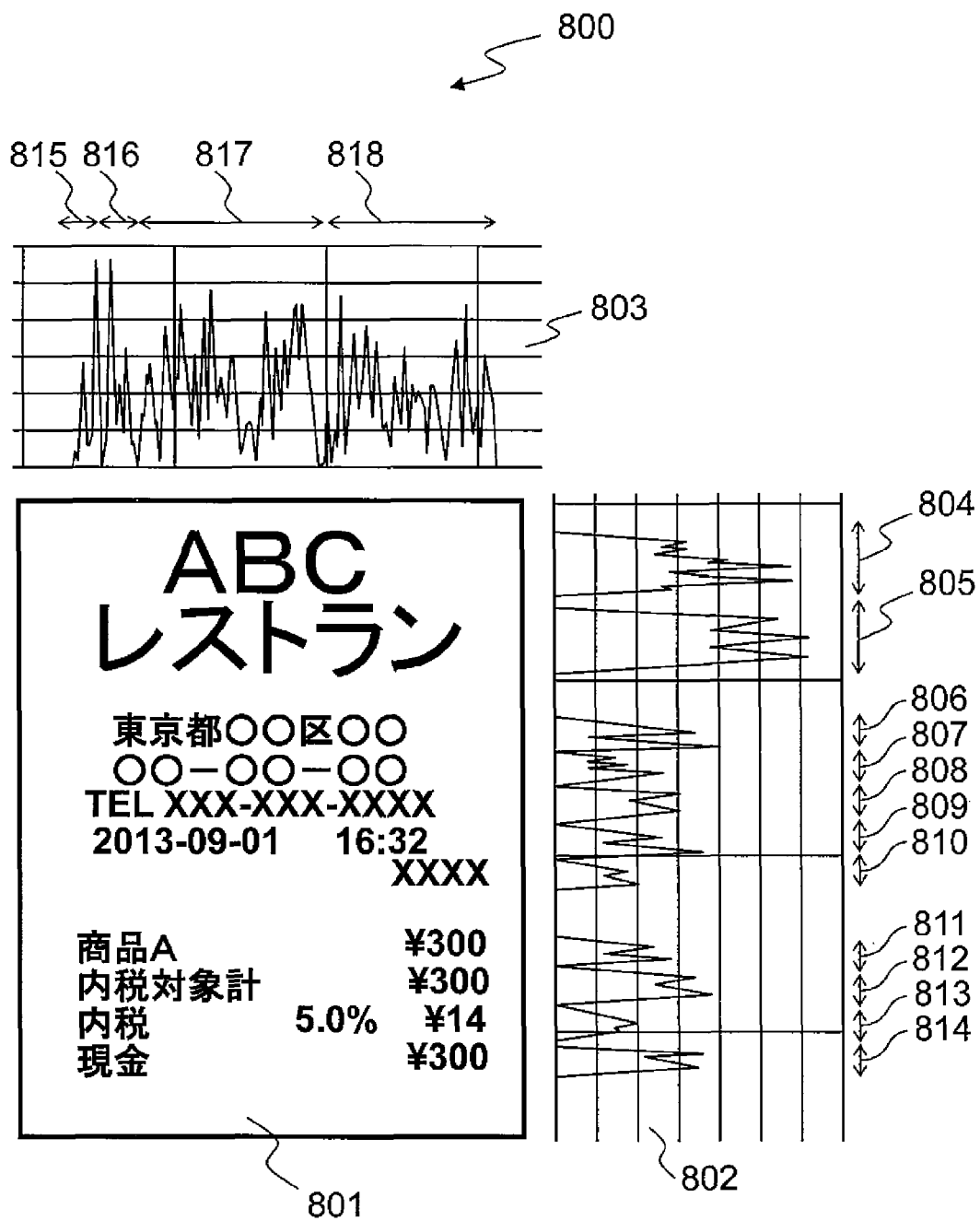
FIG. 8 is a schematic view for illustrating text direction identification processing.

FIG. 8 is a schematic view for illustrating text direction identification processing. An image 801 of FIG. 8 represents one example of a binarized image generated with respect to a receipt. A graph 802 represents a horizontal histogram which has the number of valid pixels on a line in the width direction (horizontal direction) of the receipt illustrated in the image 801 to be designated as a frequency. A graph 803 represents a vertical histogram which has the number of valid pixels on a line in a direction at right angles to the width direction of the receipt (vertical direction) illustrated in the image 801 to be designated as a frequency.

Regions 804 to 814 represent first continuous regions extracted from the horizontal histogram, and regions 815 to 818 represent first continuous regions extracted from the vertical histogram. Regions 804 to 814 and regions 815 to 816 are also extracted as second continuous regions, however, regions 817 to 818 are not extracted as second continuous regions due to length longer than a predetermined range.

As illustrated in FIG. 8, when characters are aligned horizontally, a continuous region is extracted corresponding to a character string of each row such as "ABC" and "Restaurant" from the horizontal histogram. Therefore, the number of continuous regions extracted from the horizontal histogram is the number of rows where characters are printed. On the other hand, since characters of each row in each vertical line exist in an overlapping manner, a less number of continuous regions are extracted from the vertical histogram. In the example illustrated in FIG. 8, the number of continuous regions extracted from the horizontal histogram is 11 and the number of continuous regions extracted from the vertical histogram is 4. Therefore, the text direction is identified as the horizontal direction.

Figure 9:
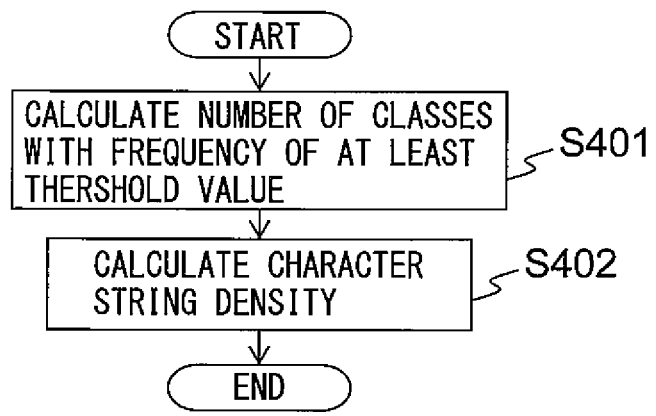
FIG. 9 is a flowchart depicting an example of an operation of character string information calculation processing.

FIG. 9 is a flowchart depicting an example of an operation of character string information calculation processing. The operation flow illustrated in FIG. 9 is executed in S110 of the flowchart illustrated in FIG. 3. In other words, the operation flow illustrated in FIG. 9 is executed after the operation flow illustrated in FIG. 7, and the character string information calculator 168 calculates character string density based on the histogram generated in S302 of FIG. 7.

Initially, the character string information calculator 168 calculates the number of all classes of a histogram generated by the histogram generator 166 and the number of classes each of whose frequency is a threshold value Th6 or more (S401). This threshold value Th6 is, for example, 1 and may be a value of 2 or more to eliminate noise of a certain level. The character string information calculator 168 calculates the number of all classes and the number of classes each of whose frequency is a threshold value Th6 or more, with respect to each of the horizontal histogram and the vertical histogram.

Subsequently, the character string information calculator 168 calculates, as a character string density, a ratio of the number of classes each of whose frequency is a threshold value Th6 or more, to the number of all classes in the histogram (S402), and then a series of steps is terminated.

As described above in detail, the operations in accordance with the flowcharts illustrated in FIGS. 3, 5, 7, and 9 make it possible for the image reading apparatus 10 to accurately identify a type of a document based on a size of the document, whether the document has a monochromatic print side, text direction, and character string density.

Figure 10:
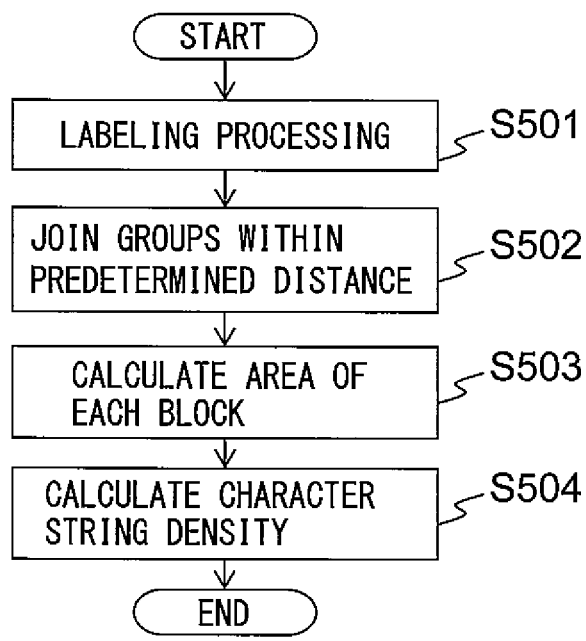
FIG. 10 is a flowchart depicting another example of an operation of character string information calculation processing.

FIG. 10 is a flowchart depicting another example of an operation of character string information calculation processing.

This flowchart is executable instead of the aforementioned flowchart illustrated in FIG. 9 in the image reading apparatus 10. In the flowchart illustrated in FIG. 10, the character string information calculator 168 calculates character string density using labeling processing.

Initially, the character string information calculator 168 determines whether each valid pixel connects to another valid pixel with respect to a binarized image generated by the binarized image generator 165, and then labels the connecting valid pixels as one group (S501). The character string information calculator 168 determines valid pixels adjacent to each other in the horizontal direction, the vertical direction, or the oblique direction (eight neighborhoods) to be connected to each other. Herein, it is possible that the character string information calculator 168 determines valid pixels adjacent to each other only in the horizontal direction or the vertical direction (four neighborhoods) to be connected to each other.

Subsequently, the character string information calculator 168 determines whether each group is close to another group and then joins the groups close to each other as one block (S502). The character string information calculator 168 joins, as a block, groups overlapping with each other in the vertical direction while mutual edges thereof are located within a predetermined distance in the horizontal direction and groups overlapping with each other in the horizontal direction while mutual edges thereof are located within a predetermined distance in the vertical direction.

Then, the character string information calculator 168 calculates an area of each block (S503). The character string information calculator 168 calculates an area of a circumscribed rectangle of a block (the number of vertical pixels×the number of horizontal pixels) as an area of the block.

Then, the character string information calculator 168 calculates a ratio of the sum of areas of circumscribed rectangles of all blocks to the number of all pixels on the binarized image as a character string density (S504), and then a series of steps is terminated.

Figure 11:
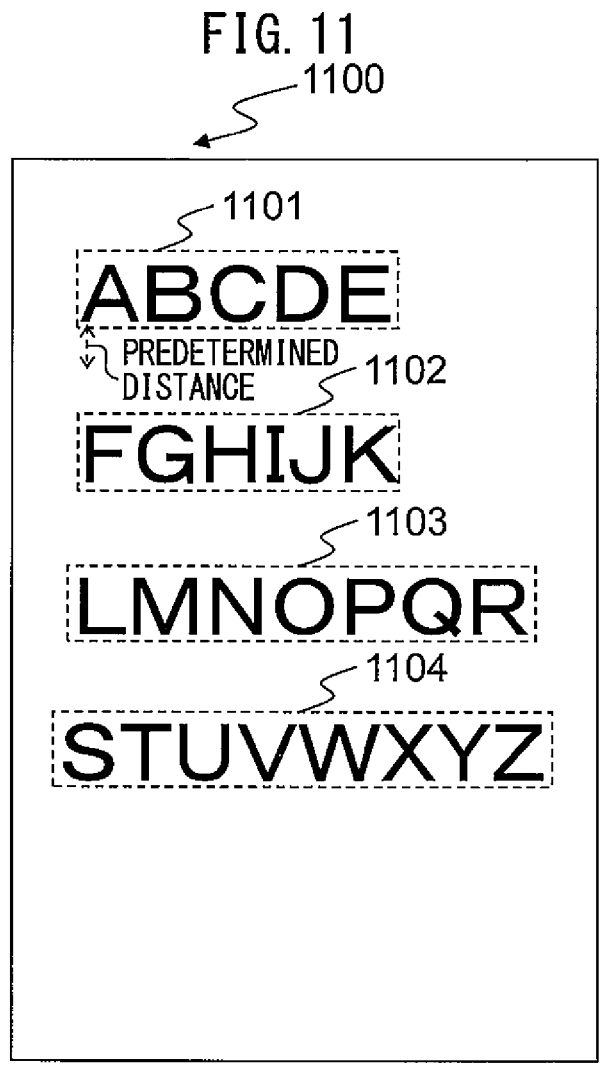
FIG. 11 is a schematic view for illustrating labeling processing.

FIG. 11 is a schematic view for illustrating labeling processing. In FIG. 11, the short-length direction is designated as the horizontal direction and the longitudinal direction is designated as the vertical direction. An image 1100 of FIG. 11 represents a binarized image. In the binarized image 1100, respective characters A to Z are labeled as one group. A group of character A and a group of character B overlap with each other in the vertical direction. In addition, a right edge of the group of character A and a left edge of the group of character B are located within a predetermined distance in the horizontal direction. Therefore, these groups are joined. In the same manner, the group of character B and a group of character C, the group of character C and a group of character D, and the group of character D and a group of character E are joined respectively. Thereby, the groups of characters A to E are joined as one block 1101. In the same manner, groups of characters F to K are joined as a block 1102, groups of characters L to R are joined as a block 1103, and groups of characters S to Z are joined as a block 1104. On the other hand, the blocks 1101 to 1104 are not joined since these blocks are distant from each other by more than a predetermined distance in the vertical direction.

Herein, it is possible that the character string information calculator 168 calculates a ratio of the sum of areas of all groups, the sum of areas of circumscribed rectangles of all groups, or the sum of all valid pixels to the number of all pixels on the binarized image as a character string density.

In S111 illustrated in FIG. 3, the document type identification module 169 determines whether the character string density is larger than a predetermined value V2. The predetermined value V2 is determined in the same manner as the predetermined value V1.

Further, it is possible that the document type identification module 169 identifies a type of a document based on both a first character string density according to a histogram calculated in the flowchart illustrated in FIG. 9 and a second character string density calculated in the flowchart illustrated in FIG. 10. In this case, when the first character string density is equal to or less than the predetermined value V1 or the second character string density is equal to or less than the predetermined value V2, the document type identification module 169 identifies that the document is not a receipt. On the other hand, when the first character string density is larger than the predetermined value V1 and also the second character string density is larger than the predetermined value V2, the document type identification module 169 identifies that the document is a receipt. Thereby, it is possible to determine more accurately whether the document is a receipt, based on horizontal components of a character string, vertical components thereof, and the total distribution.

As described above in detail, the operations in accordance with the flowcharts illustrated in FIGS. 3, 5, 7, and 10 make it possible for the image reading apparatus 10 to accurately identify a type of a document based on a size of a document, whether the document has a monochromatic print side, text direction, and character string density.

Figure 12:
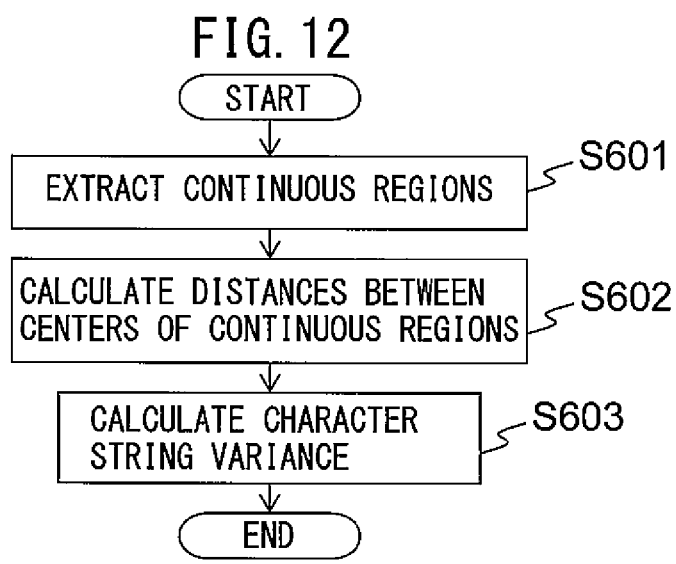
FIG. 12 is a flowchart depicting still another example of an operation of character string information calculation processing.

FIG. 12 is a flowchart depicting still another example of an operation of character string information calculation processing.

This flowchart is executable instead of the aforementioned flowchart illustrated in FIG. 9 in the image reading apparatus 10. In the flowchart illustrated in FIG. 12, the character string information calculator 168 calculates character string variance in an input image as character string information. The character string variance is a degree of character strings being dispersed (a degree of variation) in the input image.

Initially, the character string information calculator 168 extracts a first continuous region whose frequency is a threshold value or more in a histogram generated by the histogram generator 166 (S601). In the same manner as in S303 of the flowchart of FIG. 7, the character string information calculator 168 extracts the first continuous region. The character string information calculator 168 extracts the first continuous region from a horizontal histogram when the text direction is the horizontal direction, and extracts the first continuous region from a vertical histogram when the text direction is the vertical direction.

Subsequently, the character string information calculator 168 calculates a distance between the centers of the first continuous regions adjacent to each other in the histogram from which the first continuous regions have been extracted. Further, the character string information calculator 168 calculates a distance between a minimum value of the classes of the histogram and the center of the first continuous region closest to the minimum value. Still further, the character string information calculator 168 calculates a distance between a maximum value of the classes of the histogram and the center of the first continuous region closest to the maximum value (S602).

When the text direction is the horizontal direction, the character string information calculator 168 calculates the centers of the vertical direction of the respective first continuous regions, and then calculates a distance between the centers of the vertical direction of the first continuous regions adjacent to each other. Further, the character string information calculator 168 calculates a distance between a minimum value of the classes of the horizontal histogram and the center of the vertical direction of the first continuous region closest to the minimum value. Still further, the character string information calculator 168 calculates a distance between a maximum value of the classes of the horizontal histogram and the center of the vertical direction of the first continuous region closest to the maximum value.

On the other hand, when the text direction is the vertical direction, the character string information calculator 168 calculates the centers of the horizontal direction of the respective first continuous regions, and then calculates a distance between the centers of the horizontal direction of the first continuous regions adjacent to each other. Further, the character string information calculator 168 calculates a distance between a minimum value of the classes of the vertical histogram and the center of the horizontal direction of the first continuous region closest to the minimum value. Still further, the character string information calculator 168 calculates a distance between a maximum value of the classes of the vertical histogram and the center of the horizontal direction of the first continuous region closest to the maximum value.

Then, the character string information calculator 168 calculates a variance of all calculated distances as a character string variance (S603), and then a series of steps is terminated.

Figure 13:
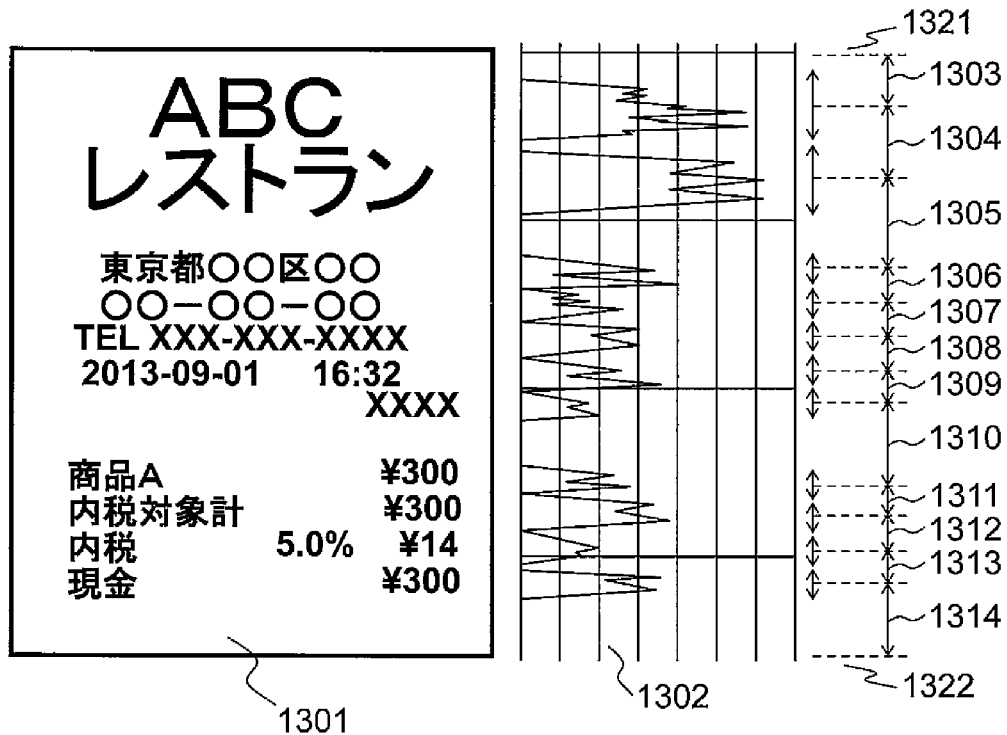
FIG. 13 is a schematic view for illustrating calculation processing of character string variance.

FIG. 13 is a schematic view for illustrating calculation processing of character string variance. An image 1301 of FIG. 13 represents one example of a binarized image generated with respect to a receipt. A graph 1302 represents a horizontal histogram for the image 1301. A dotted line 1321 represents a minimum value of the classes of the horizontal histogram, and a dotted line 1322 represents a maximum value of the classes of the horizontal histogram. Each of the dotted lines between the dotted line 1321 and the dotted line 1322 represents the center of the vertical direction of each first continuous region. A distance 1303 represents a distance between the minimum value of the classes of the horizontal histogram and the center of the vertical direction of the first continuous region closest to the minimum value. Each of the distances 1304 to 1313 represents a distance between the centers of the vertical direction of the first continuous regions adjacent to each other. A distance 1314 represents a distance between a maximum value of the classes of the horizontal histogram and the center of the vertical direction of the first continuous region closest to the maximum value.

As illustrated in FIG. 13, on a general receipt, a character string is arranged over the entire sheet. On the other hand, on a business card which has a character string arranged in the short-length direction, the character string is frequently arranged so as to be localized on the lower side. Further, when a character string such as a shooting date and time is arranged on the back side of a photograph, this character string is generally arranged in the lower edge of the photograph. Therefore, on a business card and photograph which have a character string arranged in the short-length direction, a region where characters are arranged is likely to be localized on either of the sides, compared with a general receipt. Therefore, a type of a document is able to be accurately identified based on character string variance.

In S111 illustrated in FIG. 3, the document type identification module 169 determines whether the character string variance is larger than a predetermined value V3. The predetermined value V3 is determined in the same manner as the predetermined value V1. In this manner, the document type identification module 169 identifies a type of a document based on character string variance.

Further, it is possible for the document type identification module 169 to identify a type of a document based on both character string density and character string variance. In this case, when the character string density is equal to or less than the predetermined value V1 or the character string variance is equal to or less than the predetermined value V3, the document type identification module 169 identifies that the document is not a receipt. On the other hand, when the character string density is larger than the predetermined value V1 and also the character string variance is larger than the predetermined value V3, the document type identification module 169 identifies that the document is a receipt. Thereby, it is possible to identify a type of a document more accurately.

As described above in detail, the operations in accordance with the flowcharts illustrated in FIGS. 3, 5, 7, and 12 make it possible for the image reading apparatus 10 to accurately identify a type of a document based on a size of a document, whether the document has a monochromatic print side, text direction, and character string variance.

Figure 14:
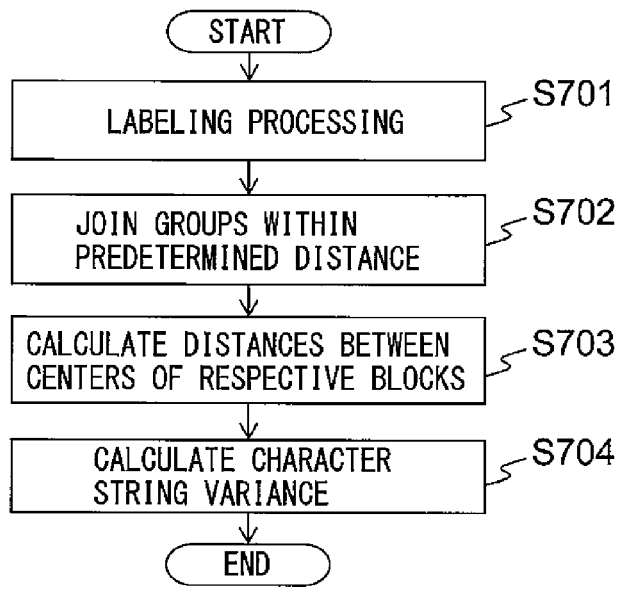
FIG. 14 is a flowchart depicting still another example of an operation of character string information calculation processing.

FIG. 14 is a flowchart depicting still another example of an operation of character string information calculation processing.

This flowchart is executable instead of the aforementioned flowchart illustrated in FIG. 12 in the image reading apparatus 10. In the flowchart illustrated in FIG. 14, the character string information calculator 168 calculates character string variance using labeling processing. Since the processing of S701 to S702 is the same as the processing of S501 to 502 illustrated in FIG. 10, the description of the former will be omitted.

In S703, the character string information calculator 168 calculates a distance between the centers of respective blocks, a distance between one edge of a binarized image and the center of a block closest to the one edge, and a distance between the other edge of the binarized image and the center of a block closest to the other edge.

When the text direction is the horizontal direction, the character string information calculator 168 calculates the centers of the vertical direction of the respective blocks and then calculates a distance between the centers of the vertical direction of blocks adjacent to each other. Further, the character string information calculator 168 calculates a distance between the upper edge of the binarized image and the center of the vertical direction of a block closest to the upper edge. Still further, the character string information nit 168 calculates a distance between the lower edge of the binarized image and the center of the vertical direction of a block closest to the lower edge.

On the other hand, when the text direction is the vertical direction, the character string information calculator 168 calculates the centers of the horizontal direction of the respective blocks and then calculates a distance between the centers of the horizontal direction of blocks adjacent to each other. Further, the character string information calculator 168 calculates a distance between the left edge of the binarized image and the center of the horizontal direction of a block closest to the left edge. Still further, the character string information nit 168 calculates a distance between the right edge of the binarized image and the center of the horizontal direction of a block closest to the right edge.

Then, the character string information calculator 168 calculates a variance of all calculated distances as a character string variance (S704), and then a series of steps is terminated.

Herein, it is possible for the character string information calculator 168 to calculate a variance of distances between the centroids of all groups, a variance of distances between the centers of circumscribed rectangles of all groups, or a variance of distances of all valid pixels as character string density.

As described above in detail, the operations in accordance with the flowcharts illustrated in FIGS. 3, 5, 7, and 14 make it possible for the image reading apparatus 10 to accurately identify a type of a document based on a size of a document, whether the document has a monochromatic print side, text direction, and character string variance.

Figure 15:
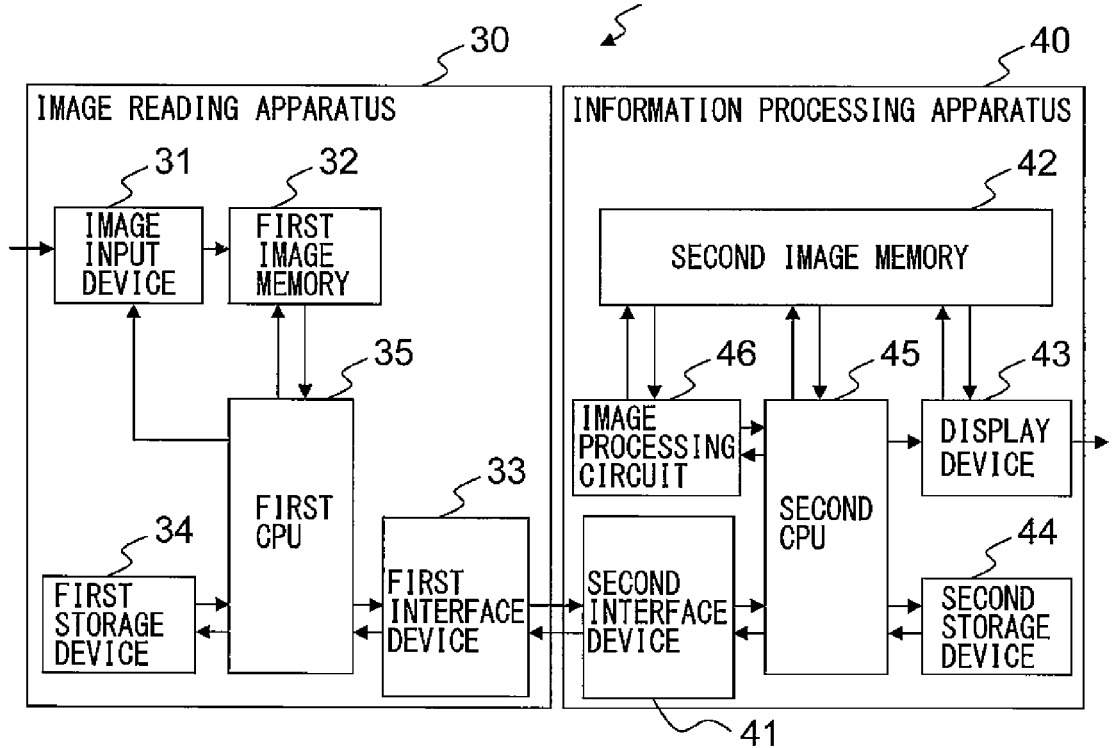
FIG. 15 is a hardware configuration diagram of another image processing system 2.

FIG. 15 is a hardware configuration diagram of another image processing system 2. The image processing system 2 illustrated in FIG. 15 and the image processing system 1 illustrated in FIG. 1 differ from each other in a apparatus including an image processing circuit. In other words, in the image processing system 2, the information processing apparatus 40 is one example of an image processing apparatus, and not the image reading apparatus 30, but the information processing apparatus 40 includes an image processing circuit 46. This image processing circuit 46 has the same function as the image processing circuit 16 of the image reading apparatus 10 illustrated in FIG. 1.

In the image processing system 2 illustrated in FIG. 15, it is possible to execute substantially the same processing as the processing illustrated in the aforementioned flowchart of FIG. 3. A description of how to perform an adaptation to the processing illustrated in the flowchart of FIG. 3 will be made below. In the image processing system 2, the processing illustrated in the flowchart of FIG. 3 is executed mainly by a second CPU 45 based on a program previously stored in a second storage device 44 in collaboration with each element of the information processing apparatus 40.

Herein, in S101 of FIG. 3, the image input device 31 of the image reading apparatus 30 generates an RGB image and an input image and stores these images in the first image memory 32. The first CPU 35 transmits each image to the information processing apparatus 40 via the first interface device 33. On the other hand, the second CPU 45 of the information processing apparatus 40 receives the each image from the image reading apparatus 30 via a second interface device 41 and then stores the each received image in a second image memory 42. The image processing circuit 46 of the information processing apparatus 40 reads and then acquires the each image from the second image memory 42 (S101).

Other processing is executed by the image processing circuit 46 of the information processing apparatus 40. These processing operations are the same as in the case of execution by the image processing circuit 16 of the image reading apparatus 10 described with respect to the image processing system 1.

In this manner, also when the information processing apparatus 40 includes the image processing circuit 46 to execute document type identification processing, the same effect is able to be obtained as in the case where an image reading apparatus includes an image processing circuit to execute document type identification processing.

The preferred embodiments of the present invention have been described but the present invention is not limited to these embodiments. For example, the functional sharing of the image reading apparatus and the information processing apparatus is not limited to the examples of the image processing systems illustrated in FIG. 1 and FIG. 15, and and it is possible to appropriately change an arrangement manner of each part of the image reading apparatus and the information processing apparatus, including each unit in the image processing circuit, in either of the image reading apparatus and the information processing apparatus. Alternatively, it is also possible to configure the image reading apparatus and the information processing apparatus as a single apparatus.

Further, in the image processing system 1 or 2, it is possible for the image reading apparatus and the information processing apparatus to be connected to each other via a network such as the Internet, a telephone network (including a mobile network and a general fixed-line telephone network), and an intranet. Alternatively, the image reading apparatus and the information processing apparatus may be connected to each other via a wireless LAN (Local Area Network). In this case, the first interface device and the second interface device each include a communication interface circuit for a connected network. Further, it is possible to distribute and arrange a plurality of information processing apparatuses on the network and to share image processing such as document type identification, image data storage, and the like in collaboration with the respective information processing apparatuses so as to provide image processing services by a cloud computing configuration. Thereby, the image processing system is able to efficiently execute document type identification processing with respect to input images generated by a plurality of image reading apparatuses.

According to the image processing apparatus and the image processing method, and the computer-readable, non-transitory medium, a type of a document is identified based on character string density or character string variance of an input image, so it is possible to accurately identify a type of a document.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   an input image acquisition module for acquiring an input image generated by reading a document;
   a histogram generator for generating a histogram of valid pixels in the input image;
   a character string information calculator for extracting continuous regions in the histogram and calculating character string variance in the input image, based on a distance between a maximum value of classes of the histogram and a center of a continuous region closest to the maximum value, and distances between centers of the continuous regions adjacent to each other; and
   a document type identification module for identifying a type of the document based on the character string variance.

2. The image processing apparatus according to claim 1, further comprising:
   a binarized image generator for generating a binarized image by binarizing the input image, wherein
   the histogram generator generates the histogram of valid pixels in the binarized image.

3. The image processing apparatus according to claim 2, wherein
   the histogram generator generates the histogram by using classes each of which is one or more lines of a horizontal direction or a vertical direction in the binarized image and frequencies each of which is the number of valid pixels in corresponding lines of a horizontal direction or a vertical direction, and
   the character string information calculator further extracts regions specified by continuous classes, a frequency of each region being equal to or greater than a threshold value in the histogram, as the continuous regions and calculates, as the character string variance, a variance of a distance between a minimum value of the classes of the histogram and a center of the continuous region closest to the minimum value, the distance between a maximum value of the classes of the histogram and the center of the continuous region closest to the maximum value, and the distances between centers of the continuous regions adjacent to each other.

4. The image processing apparatus according to claim 1, wherein the document type identification module identifies at least one of a business card, a receipt, and a photograph as the type of the document.

5. The image processing apparatus according to claim 1, further comprising
   a document size calculator for calculating a size of the document, wherein
   the document type identification module identifies the type of the document further based on the size of the document.

6. The image processing apparatus according to claim 1, further comprising
   a print color identification module for identifying whether the document has a monochromatic print side, wherein
   the document type identification module identifies the type of the document further based on whether the document has the monochromatic print side.

7. The image processing apparatus according to claim 1, further comprising
   a text direction identification module for identifying a text direction where characters printed in the document are aligned, wherein
   the document type identification module identifies a type of the document further based on the text direction.

8. An image processing method comprising:
   acquiring an input image generated by reading a document;
   generating a histogram of valid pixels in the image;
   extracting continuous regions in the histogram and calculating a character string variance in the input image, based on a distance between a maximum value of classes of the histogram and a center of a continuous region closest to the maximum value, and distances between centers of the continuous regions adjacent to each other; and
   identifying, using a computer, a type of the document based on the character string variance.

9. The image processing method according to claim 8, wherein the type of the document is at least one of a business card, a receipt, and a photograph.

10. The image processing method according to claim 8, further comprising calculating a size of the document, wherein the type of the document is identified further based on the size of the document.

11. The image processing method according to claim 8, further comprising identifying whether the document has a monochromatic print side, wherein the type of the document is identified further based on whether the document has the monochromatic print side.

12. The image processing method according to claim 8, further comprising identifying a text direction where characters printed in the document are aligned, wherein the type of the document is identified further based on the text direction.

13. A computer-readable, non-transitory medium storing a computer program, wherein said computer program causes a computer to execute a process, the process comprising:
- acquiring an input image generated by reading a document;
- generating a histogram of valid pixels in the image;
- extracting continuous regions in the histogram and calculating a character string variance in the input image, based on a distance between a maximum value of classes of the histogram and a center of a continuous region closest to the maximum value, and distances between centers of the continuous regions adjacent to each other; and
- identifying, using a computer, a type of the document based on the character string variance.

14. The computer-readable, non-transitory medium according to claim 13, wherein the type of the document is at least one of a business card, a receipt, and a photograph.

15. The computer-readable, non-transitory medium according to claim 13, the process further comprising calculating a size of the document, wherein the type of the document is identified further based on the size of the document.

16. The computer-readable, non-transitory medium according to claim 13, the process further comprising identifying whether the document has a monochromatic print side, wherein the type of the document is identified further based on whether the document has the monochromatic print side.

17. The computer-readable, non-transitory medium according to claim 13, the process further comprising identifying a text direction where characters printed in the document are aligned, wherein the type of the document is identified further based on the text direction.

\* \* \* \* \*